(12) United States Patent
Maeda et al.

(10) Patent No.: US 8,139,277 B2
(45) Date of Patent: Mar. 20, 2012

(54) MULTIPLE-SOURCE MULTIPLE-BEAM POLARIZED LASER SCANNING SYSTEM

(75) Inventors: Patrick Yasuo Maeda, Mountain View, CA (US); Philipp Helmut Schmaelzle, Los Altos, CA (US)

(73) Assignee: Palo Alto Research Center, Incorporated, Palo Alto, CA (US)

( * ) Notice: Subject to any disclaimer, the term of this patent is extended or adjusted under 35 U.S.C. 154(b) by 268 days.

(21) Appl. No.: 12/690,754

(22) Filed: Jan. 20, 2010

(65) Prior Publication Data

US 2011/0176193 A1   Jul. 21, 2011

(51) Int. Cl.
*G02B 26/08* (2006.01)

(52) U.S. Cl. .................................. 359/204.1

(58) Field of Classification Search .... 359/204.1–204.3, 359/490

See application file for complete search history.

(56) References Cited

U.S. PATENT DOCUMENTS

| | | | |
|---|---|---|---|
| 7,236,280 B2 | 6/2007 | Makino | |
| 7,325,957 B2 * | 2/2008 | Morejon et al. | 362/555 |
| 7,466,331 B2 | 12/2008 | Maeda | |
| 2001/0035999 A1 | 11/2001 | Saito et al. | |
| 2005/0219496 A1 | 10/2005 | Oshida et al. | |
| 2006/0139441 A1 | 6/2006 | Ono et al. | |
| 2008/0267662 A1 | 10/2008 | Arai et al. | |

FOREIGN PATENT DOCUMENTS

| | | |
|---|---|---|
| EP | 1801940 A1 | 6/2007 |
| EP | 2253987 A1 | 11/2010 |
| EP | 11150827 | 4/2011 |

* cited by examiner

*Primary Examiner* — Euncha Cherry
(74) *Attorney, Agent, or Firm* — Jonathan A. Small

(57) ABSTRACT

Two integrated multi-beam sources are positioned and disposed such that each emits light toward an optical splitter. The emitted light is polarized such that the splitter brings the optical paths of the two integrated multi-beam sources generally parallel to one another such that the optical system aperture throughput for the two integrated multi-beam sources is roughly the same as for a single integrated multi-beam source. The splitter may be such that a portion of the optical energy from each source is directed into an imaging path and a portion of the optical energy is directed toward one or more non-polarizing splitters and optical sensors for, inter alia, controlling the output of the sources. In various embodiments, the number of splitters, and hence the extent of optical loss, may be reduced by use of a combined polarized and non-polarized splitter, dual polarized splitters, and time-sequenced beam generation and monitoring.

20 Claims, 15 Drawing Sheets

MULTIPLE-SOURCE MULTIPLE-BEAM POLARIZED LASER SCANNING SYSTEM

BACKGROUND

The present disclosure is related to imaging systems, and more specifically to multiple-beam laser sources and imaging systems used in printers, copiers, facsimile machines and the like employing same.

There are several types of modern imaging (e.g., printing and copying) devices, typically separated by the type of system (or imaging engine) used to produce an image. One example is an electrophotographic marking system, which forms the imaging engine for many modern printers, copiers, facsimile machines, and other similar devices.

In a typical electrophotographic marking system, a light source such as a laser is caused to expose a photosensitive surface, such as a charged photoreceptor, with a representation of a desired image. The photoreceptor is discharged where exposed, creating an electrostatic latent image on the photoreceptor's surface. Toner particles are then selectively applied to the photosensitive surface where exposed (or alternatively where not exposed), forming a latent (toner) image, which is then transferred onto a substrate, such as a sheet of paper. The transferred toner is then fused to the substrate, usually by using heat and/or pressure, to thereby create a permanent printed image on the substrate. The surface of the photoreceptor is then cleaned of residual toner and recharged in preparation for subsequent image production.

The foregoing broadly describes a monochrome (black and white) electrophotographic marking system. Electrophotographic marking can also produce polychromatic (color) images in several different ways, for example by repeating the above process once for each color of toner that is used to make a composite color image. In one example of a color process, called a READ IOI process (Recharge, Expose, and Develop, Image On Image), a charged photoreceptive surface is exposed to a light image which represents a first color, say cyan. The resulting electrostatic latent image is then developed with cyan toner to produce a cyan toner image. The charge, expose, and develop process is repeated, using the same photoreceptor, for a second color, say yellow, then for a third color, say magenta, and finally for a fourth color, say black. The various latent images and color toners are placed in a superimposed registration such that a desired composite color image results. That composite color image is then transferred and fused onto a substrate. Alternatively, a multiple exposure station system can be employed, requiring a separate charging, exposing, and developing station for each color of toner.

One way of exposing a photoreceptor in systems such as those described above is to use a laser array source subsystem and a Raster Output Scanner (ROS) subsystem. A laser array source subsystem is typically comprised of a multiple source laser array and associated optics for collimating, focusing, etc. the laser beams output by the array. A ROS subsystem is typically comprised of a rotating polygon having a plurality of mirrored facets, and a post-polygon optical system. In a simplified description of operation, a collimated laser beam is reflected from the facets of the polygon and passed through imaging elements that project the laser beam into a finely focused spot of light on the photoreceptor's surface. As the polygon rotates, the source beam traces a path on the photoreceptor surface referred to as a scan line. By synchronizing motion of the photoreceptor with the polygon rotation, the spot raster scans (i.e., one line after another) the surface of the photoreceptor. By modulating the laser beam with image information a desired latent image is produced on the photoreceptor. The direction of the sweeping beam is referred to as the scan direction, while the generally perpendicular direction of motion of the photoreceptor is called the process direction.

One measure of the quality of a printing system is its scan resolution. Scan resolution is essentially a measure of how finely an individual pattern of printed pixels may be positioned by a printing system. Modern printing systems reach scan resolutions as high as 2400 dots-per-inch (dpi). This produces very smooth curves, solid blocks of color, smooth color transitions, and so forth. To practically achieve this resolution, the light source used with the ROS system is an integrated array capable of simultaneously producing multiple, individually addressable, spaced-apart light beams. Current state-of-art printing systems use an integrated array of as many as 32 laser light sources for ROS printing. A vertical cavity surface emitting laser (VCSEL) two-dimensional array is a typical integrated source used in ROS-type electrophotographic marking systems.

An exemplary 8-row-by-4-column integrated array provides columns of sources at the laser array with each source spaced apart in the scan direction by 30-40 microns, the sources in each column spaced apart by 20-30 microns, and each column shifted downward in the process direction from the previous column by 5-10 microns. Such an integrated array employed in a typical ROS system produces a spot pattern on the photoreceptor such that each spot is spaced apart in the scan direction by 450-550 microns, spot-to-spot spacing in the process direction of 42.333 microns, and each column of spots shifted downward in the process direction from the previous column by 10.583 microns. FIG. 1 is a beam layout 10 viewed in plan view of the exit facet of an integrated multi-beam source according to a known array for simultaneously producing 32 individually addressable, spaced-apart light beams 12. FIG. 2 is a spot pattern 14 produced by the array of FIG. 1 (post-optics) at the photosensitive surface (image plane) according to the prior art in which each of the 32 lasers produce a spot 16.

FIG. 3 is an exemplary prior art imaging apparatus 20, such as a printer, copier, or the like. While an in-depth review of a complete apparatus 20 is beyond the scope of the present disclosure, a detailed description of such a device may be found, for example, in U.S. Pat. No. 7,466,331 and U.S. Pat. No. 7,236,280, each of which being incorporated herein by reference.

Briefly, a typical apparatus 20 comprises a raster output scanner (ROS) sub-system 22, an array source subsystem 24, rotating polygon mirror and lens assembly 26, and controller 28 which manages these elements to produce a light beam(s) "b" which is made incident on the photosensitive surface of a rotating photoreceptor 30. Toner is selectively picked up by the photoreceptor 30 where exposed by beam b to form a latent image, which is then transferred and fused to a paper substrate 32. The photoreceptor is cleaned and recharged, and the process repeated.

With reference to FIG. 4, raster output beam array scanning sub-system 22 of a type known in the art is shown. As mentioned, scanning sub-system 22 typically includes a polygon mirror and lens assembly subsystem 26, which itself comprises a rotating polygon mirror 34, and numerous optical elements 36 which, among other functions, serve to provide a compact optical path and optical beam conditioning and correction for the beam(s) produced by integrated multi-beam laser source 25 of array source subsystem 24. Array source subsystem 24 generates one or more light beams which together form a beam array 38. Optical elements focus and collimate the beam array 38, and an aperture 40 defines the width of the collimated beams from the array.

A beam splitter 42 may be disposed in the optical path of beam array 38. Beam splitter 42 allows some amount of the light energy of beam array 38 to pass therethrough to proceed to polygon mirror 34, optical elements 36 and ultimately to photoreceptor 30. Beam splitter 42 redirects the balance of the light energy to a beam monitor 44 such as a photodiode optical power monitor. The basis for splitting the beam array in this fashion is to provide a view of the beam array which can be used to adjust power, time pulse sequencing, beam position, and other attributes of array source subsystem 24 and the process of generating beam array 38. This monitoring is particular important in high-resolution, multi-beam system in order to obtain optimum output quality.

However, there is an ever-present demand for improved imaging quality. Electrophotographic marking systems are comprised of a number of optical elements. Unavoidable imprecision in the shape and/or mounting of these optical elements, wear, environmental changes, etc. inevitably introduce anomalies in the quality of the scan line on the photoreceptor, leading to reduced quality imaging. One such anomaly is slight variation in scan line spacing on the photoreceptor. Such spacing variation, even if slight, can lead to perceptible tone variation in the scan line direction of the printed image, commonly referred to as banding artifacts. FIG. 5 shows light and dark streaks within an image 18 which represent banding artifacts in that image as printed. Furthermore, the perceptibility of such banding increases in multiple-color printing systems due to color mixing and the ability of the human eye to accurately detect certain nonlinearities in color gradation. Another common imaging quality issue is the stair-step pattern produced when attempting to print a curve, commonly known as "jaggies".

One approach to increasing image quality from an electrophotographic marking system is to simply increase the number of laser sources forming the integrated array to increase the scan resolution. However, while an integrated array with 32 individual sources is currently a reasonably standard, readily available device, integrated laser arrays with more than 32 sources are not. Thus, any system incorporating an integrated array of more than 32 sources must account for the significantly increased cost of a specially designed and built laser array. In addition, as one adds sources to an array either the source spacing shrinks, making array fabrication more difficult and costly, or the optical system aperture decreases relative to the output beam divergence of the laser due to a smaller required optical magnification, thus requiring an increase in per-laser power. Higher powered lasers run hotter, have a shorter lifespan, and are again non-standard. Furthermore, for each additional source in an integrated array there is a corresponding increase in the risk of a device failing and rendering the entire integrated array device non-useable.

If one were to simply abut two or more integrated laser arrays and direct the beams they produce to a single spot on the scanning subsystem for scanning, as disclosed for example in the aforementioned U.S. Pat. No. 7,236,280, the beams from each array will travel in different optical paths. Inherent operating variations such as thermal changes result in different displacements for the different optical paths, resulting in visible printing artifacts in the final printed image.

Thus, there are a number of compelling reasons that simply increasing the number of sources in an integrated array as well as simply abutting two integrated arrays together and directing their output to the scanning subsystem are not practical responses to the demand for increased resolution.

SUMMARY

Accordingly, the present disclosure is directed to an apparatus for improving the image quality produced by marking systems which does not require redesigning integrated light sources, nor increasing their output power. A combination of a number of integrated polarized multi-beam sources and a polarizing beam splitter are used to produce an increased number of beams and spots, thereby permitting an improved printing resolution and a decrease in printing artifacts.

According to one aspect of the disclosure, two s-polarized integrated multi-beam sources comprising individually addressable light emitters are positioned and disposed such that each emits light roughly perpendicularly to one another. The splitter is of a type in which the optical paths of said first laser beams and the optical paths of said second laser beams may be made to be generally parallel to one another, and further such that a first polarization is transmitted and a second polarization is reflected by the splitter. Furthermore, the splitter is of a type such that the optical system aperture throughput for the two integrated multi-beam sources is roughly the same as for a single integrated multi-beam source.

According to one embodiment, the optical splitter is a polarizing beam splitter which transmits p-polarized light and reflects s-polarized light. Light in the optical path of the first integrated source is p-polarized, such that at least a portion of the light beam energy therefrom passes though the splitter into an imaging path (i.e., in the path toward the photosensitive surface). Light from the optical path of the second integrated source is s-polarized such that at least a portion of the light beam energy therefrom is reflected by the splitter into the imaging path.

In one instance of this embodiment, both first and second integrated light sources are such that they produce s-polarized light. A half-wave plate is located in the optical path of the first integrated light source, between the first integrated light source and the polarizing splitter, which rotates the polarization of the light from s-polarization to p-polarization. The polarizing splitter passes the p-polarized light into the imaging path. S-polarized light from the second integrated light source is reflected by the polarizing splitter, also into the imaging path. Thus, light from the first and second integrated arrays are made approximately parallel in the imaging path.

According to another embodiment, a non-polarizing beam splitter is positioned and disposed in the light paths of the first and second integrated light sources. A portion of the light in each path is thereby directed out of said path towards an optical sensor. In this embodiment, the optical sensors may be used to measure optical power or other attributes of the light beams produced by the first and second integrated multi-beam sources, on a source-by-source basis.

According to a further embodiment, the optical splitter is a "leaky" polarizing beam splitter, for example allowing 5% of the light incident thereon to be reflected (p-polarization) or transmitted (s-polarization). The optical path of the first integrated source is such that a portion of the light therefrom passes though the splitter into the imaging path (i.e., in the path toward the photosensitive surface) while the balance of the light (the "leaked" light) is reflected by the splitter. The optical path of the second integrated source is such that a portion of the light therefrom is reflected by the splitter into the imaging path while the balance of the light (the "leaked" light) passes thorough the splitter.

Furthermore, an optical sensor is positioned and disposed such that it may receive light from the splitter. The optical path of the first integrated array is such that the leaked light which is reflected by the splitter is directed to the optical sensor. The optical path of the second integrated array is such that the leaked light which passes through the splitter is directed to the optical sensor. The beams from the first and second arrays are timed in conjunction with timing of the sensing by the optical sensor such that the source of the sensed beam may be determined, for example by time division multiplexing. In this embodiment, the optical sensor may be used to measure optical power or other attributes of the light beams produced by the first and second integrated multi-beam sources on a source-by-source basis, and the individual splitters and sensors for each of the first and second arrays are eliminated.

According to yet another aspect of the present disclosure, the first and second integrated multi-beam sources are positioned and disposed relative to the splitter such that beams from the first and second integrated arrays are incident on the photosensitive surface at a first array of spots and a second array of spots, respectively. The second array of spots are shifted in position relative to said first array of spots. According to one embodiment, the second array of spots are shifted in position relative to the first array of spots by generally half the process-direction spacing and generally half the scan-direction spacing between the spots comprising the first array of spots. Other relative positions of the first and second arrays of spots may alternatively be selected.

Finally, the present disclosure contemplates systems, such as marking, printing, and other imaging systems which include an electrophotographic marking system, and variations thereof, otherwise disclosed herein.

The above is a summary of a number of the unique aspects, features, and advantages of the present disclosure. However, this summary is not exhaustive. Thus, these and other aspects, features, embodiments, and advantages of the present disclosure will become more apparent from the following detailed description and the appended drawings, when considered in light of the claims provided herein.

BRIEF DESCRIPTION OF THE DRAWINGS

In the drawings appended hereto like reference numerals denote like elements between the various drawings. While illustrative, the drawings are not drawn to scale. In the drawings.

DETAILED DESCRIPTION

While the following description will be in terms of certain preferred embodiments, and variations thereof, it will be understood that it is not intended that this disclosure be limited to those embodiments. In certain instances variations of the described embodiments will be highlighted, however many alternatives beyond those explicitly disclosed and described will become apparent to one of ordinary skill in the art upon review of this disclosure. Thus, the present description is intended to cover all alternatives, modifications, and equivalents as may be appreciated from this description and the claims appended hereto.

Figure 6:
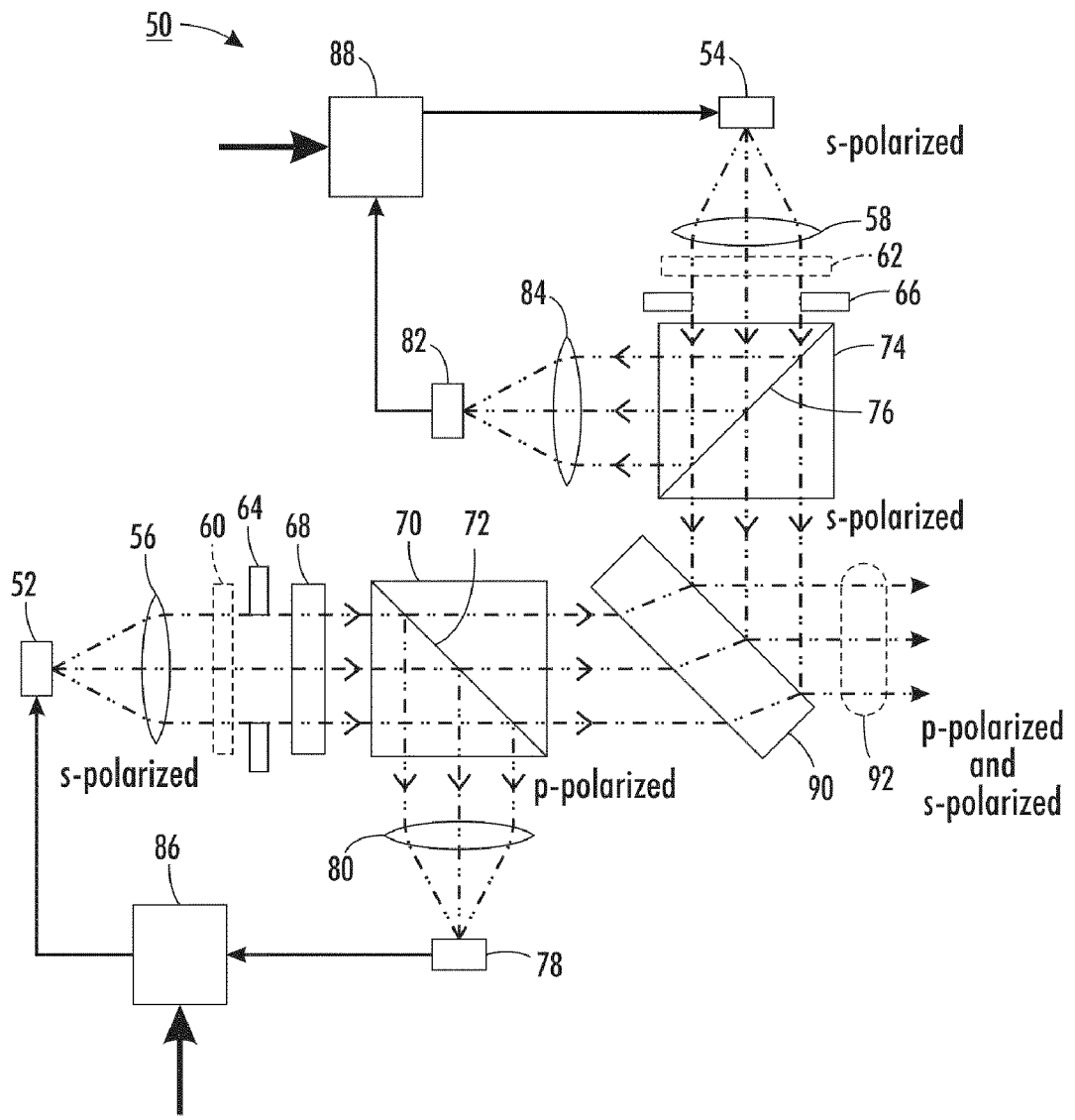
FIG. 6 is an illustration of an array source subsystem comprising two integrated multi-beam sources and a splitter according to one embodiment of the present disclosure.

With reference to FIG. 6, there is shown what is referred to herein as array source subsystem 50 according to one aspect of the present disclosure. Array source subsystem 50 comprises first integrated multi-beam source 52 and second integrated multi-beam source 54, each comprising a plurality of laser emitters (individual emitters not shown) for simultaneously producing a plurality of independently controllable laser beams. Initially, first and second integrated multi-beam source 52, 54 are positioned and disposed such that the optical paths of the beams emitted by first integrated multi-beam source 52 are non-parallel to the optical beams emitted by second integrated multi-beam source 54. As will be discussed further below, in certain embodiments beams emitted by first integrated multi-beam source 52 may be roughly perpendicular to the optical beams emitted by second integrated multi-beam source 54.

In one example, first and second integrated multi-beam sources 52, 54 comprise integrated vertical cavity surface emitting lasers (VCSELs) in which a plurality of emitters are arranged in a two-dimensional array. A VCSEL is integrated in that a single structure has multiple, independently operable light emitting devices formed therein, often on a single substrate or die. VCSELs are just one example, and other structures such as integrated edge emitting devices may also be employed. While lasers are described as forming a part of this embodiment, it will be appreciated that many other forms of unpolarized light sources, such as light emitting diodes (LEDs), organic light emitting diodes (OLEDs), and so forth may be equivalently substituted, with the addition of appropriate polarizing filters, for the laser sources described. The number of independently controllable emitters, and hence beams, per integrated multi-beam source is a matter of design choice. For the purposes of illustration, a source will be considered to have 32 independently operable emitters, although the concepts disclosed herein readily extend to fewer or more emitters per integrated multi-beam source.

Light produced by first and second integrated multi-beam source 52, 54 is polarized. This polarization is preferably an attribute of the light as it is emitted by sources 52, 54, although it may also be provided by optical elements associated with sources 52, 54, such as discrete half-wave filters and the like (not shown), as well understood. In one embodiment, first and second integrated multi-beam sources 52, 54 are vertical cavity surface emitting solid-state lasers (VCSELs). Polarized output from the VCSELs is dependent on the rotational position of the VCSELs in the assembled apparatus, as well as on the nature of the output of the VCSELs. The VCSELs can be made slightly elliptical and/or use an intentionally misoriented substrate to create a sufficient degree of asymmetry to control the polarization. The VCSELs are oriented relative to the optical surfaces in the downstream optical system (i.e. beamsplitter, polygon facet, etc.) to determine the s and p polarization.

Optical elements 56, 58 collimate and direct the beams produced by the individual emitters of first and second integrated multi-beam sources 52, 54, respectively, into beam arrays 60, 62. Apertures 64, 66 limit the beam width of the first and second beam arrays, respectively.

Located in the optical path of the beams emitted by source 52 is a half-wave plate 68. In this embodiment, light emitted by source 52 is preferably s-polarized. Half-wave plate 68 rotates the polarization of the beams in this optical path to p-polarization. In one alternate embodiment, source 52 may be a p-polarized source and source 54 may be an s-polarized source, thus obviating the need for half-wave plate 68.

Also located in the optical path of the beams emitted by source 52 is a first beam splitter 70. In addition, located in the optical path of the beams emitted by source 54 is a second beam splitter 74. Beam splitters 70, 74 may be devices with partially metalized coatings or non-polarizing multilayer dielectric coatings. Furthermore, pellicle, plate type or cube type beam splitters can be used. According to this embodiment, first beam array 60 enters splitter 70 and is incident on semi-reflective surface 72, and second beam array 62 enters splitter 74 and is incident on semi-reflective surface 76. In one specific instance of this embodiment, semi-reflective surfaces 72, 76 transmit roughly 95 percent of the incident light energy, and reflect the remaining roughly 5 percent light energy at 90 degrees to the angle of incidence, although other specific ratios of transmitted to reflected light are contemplated.

Array source subsystem 50 also comprises a first beam monitor 78 and associated focusing optics 80 for first beam array 60, and a second beam monitor 82 and associated focusing optics 84 for second beam array 62. Beam monitors 78, 82 may for example comprise a photodiode optical power monitor, whose role has previously been described and is beyond the scope of this disclosure. The output of beam monitor 78 can be analyzed and used by driver system 86 to control and correct the beam power, position, and other attributes of the beams produced by first integrated multi-beam source 52. Similarly, the output of beam monitor 82 can be analyzed and used by driver system 88 to control and correct the beam power, position, and other attributes of the beams produced by second integrated multi-beam source 54.

Array source subsystem 50 further comprises a polarizing beam splitter 90 disposed in the optical paths of first and second beam arrays 60, 62. In one embodiment, splitter 90 is a polarizing beam splitter, although other types of elements may also serve the functional role of splitter 90 in this embodiment. According to this embodiment, first beam array 60 enters splitter 90, which is predominantly transmissive to p-polarized light. The p-polarized light of first beam array 60 is thus transmitted into an image path (e.g., toward a ROS subsystem, discussed further below). Any "leaked" s-polarized light in first beam array 60 is effectively reflected by splitter 90 out of the image path. Similarly, the s-polarized light of second beam array 62 enters splitter 90, which is predominantly reflective to s-polarized light. The s-polarized light of second beam array 62 is thereby reflected into the image path, generally perpendicular to the path of the light of first beam array 60 transmitted by splitter 90. Any "leaked" p-polarized light in second beam array 62 is effectively transmitted by splitter 90 out of the image path. Position control optics (not shown) may be required to ensure that the transmitted portions of first beam array 60 and the reflected portion of second beam array 62 are parallel in the image path post-splitter 90, considering for example, the angle of refraction of first beam array 60 through splitter 90, the angle of reflection of second beam array 62 from the surface of splitter 90, Brewster's angle, etc.

Figure 7:
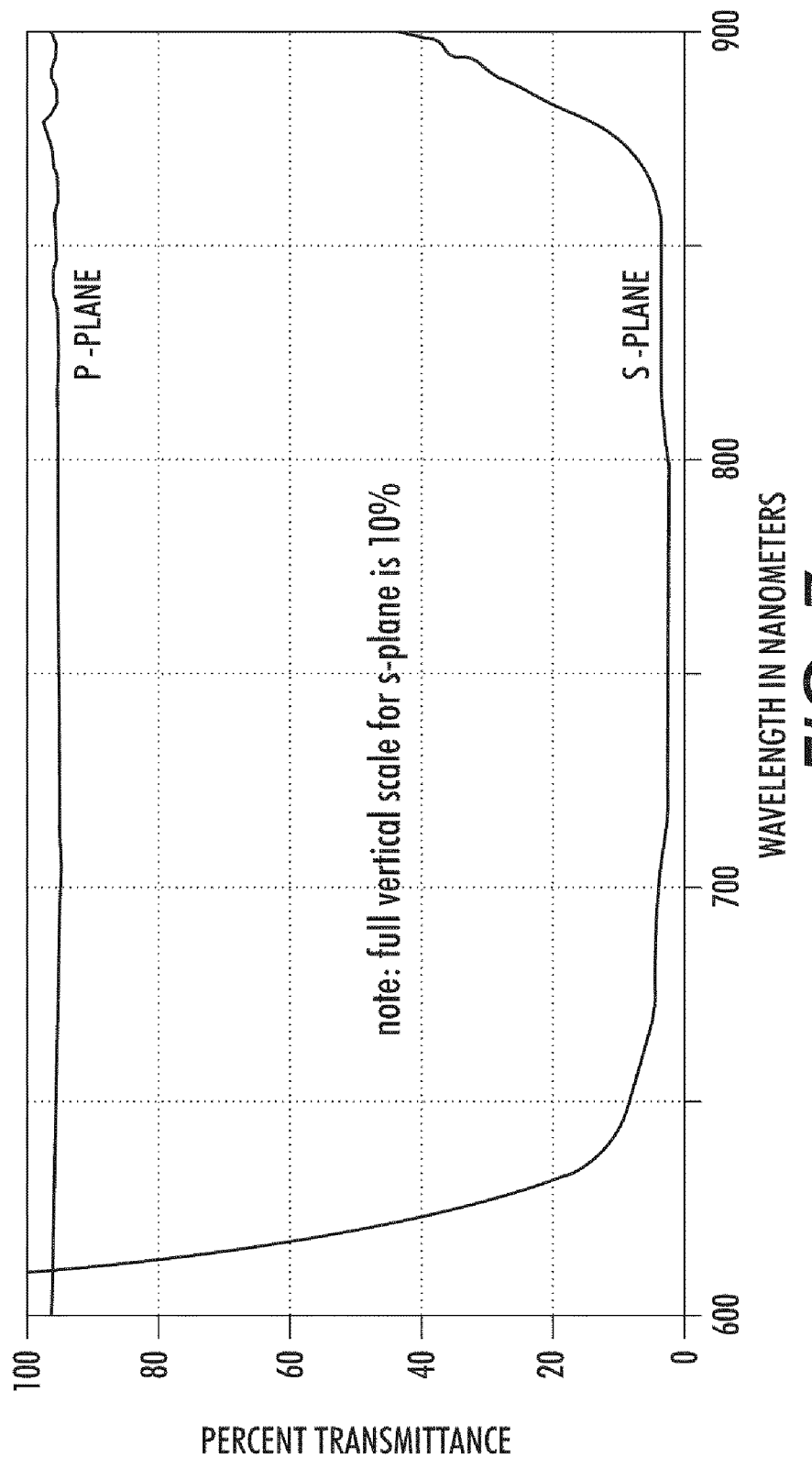
FIG. 7 is a graph of the percent transmittance against light wavelength for both p-polarized light and s-polarized light for an example polarizing beam splitter which may be employed in one embodiment of the present disclosure.

FIG. 7 is a graph of the percent transmittance against light wavelength for both p-polarized light and s-polarized light for an example polarizing beam splitter 90. In one embodiment, first and second sources 52, 54 emit light at 780 nm. Thus, such an example polarizing beam splitter 90 would effectively transmit the p-polarized light of first array 60 and effectively reflect the s-polarized light of second array 62.

Beam arrays 60 and 62 are each themselves comprised of a plurality of individual spatially separated laser beams. Elements of array source subsystem 50 are further positioned and disposed such that the individual spatially separated laser beams exiting splitter 90 in the imaging path (toward the ROS subsystem) form an imaging beam array 92 comprised of a plurality of individual, spatially separated laser beams of both p-polarized and s-polarized light. The spacing of those beams is discussed further below, but it should be noted that beams from first integrated multi-beam source 52 and second integrated multi-beam source 54 in this path are generally parallel or distributed within a small angular range and spatially overlap in varying amounts relative to one another.

The embodiment described above effectively doubles the number of beams, and hence spots, available for writing to the photosensitive surface. As previously mentioned, typical high-performance marking systems employ integrated multi-beam sources of as many as 32 individual, independently controllable beams. Thus, the embodiment above provides an imaging beam array of as many as 64 individual, independently controllable beams. Importantly, while the number of individual beams in an imaging beam array 92 is effectively doubled, the optical aperture throughput does not increase over that of prior systems. That is, the ratio of the process-direction beam spacing at the laser to the process-direction beam spacing at the photosensitive surface does not change. Thus, the power of the individual laser emitters need not be increased according to the above embodiment. The use of half-wave plate 68, as well as beam splitters 70, 74 for monitoring first and second beam arrays 60, 62 does result in a slight decrease of optical power for each of the first and second beam arrays 60, 62. However, the total power at the photosensitive surface is the sum of the optical powers of the individual beams at the photosensitive surface. As there are twice as many beams in the embodiment described above as compared to the prior systems, the loss of beam power at splitters 70, 74 is more than offset by the doubling of the number of individual beams. So the laser power requirement per beam is significantly reduced. Furthermore, the optical power which does not form a part of the imaging beam array 92 is used for automatic power control (APC) detection and other aspects of monitoring and controlling the output of the integrated multi-beam sources 52, 54.

Figure 8:
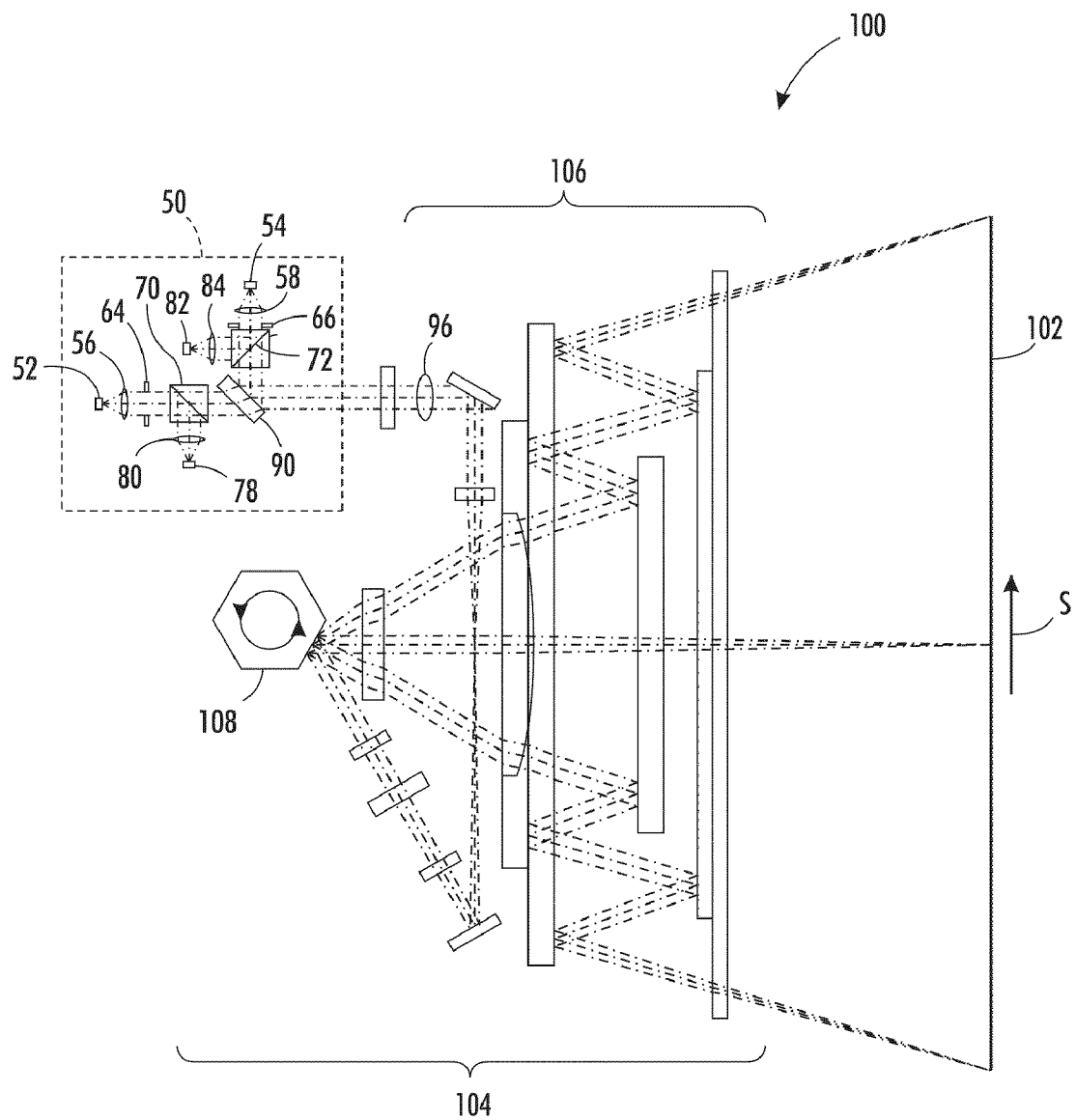
FIG. 8 is an illustration of a beam array scanning system, including an array source subsystem of a type illustrated in FIG. 6, according to one embodiment of the present disclosure.

With reference next to FIG. 8, there is shown therein an array source subsystem 50 integrated into a beam array scanning subsystem 100, in this case a ROS subsystem, according to another embodiment of the present description. Array source subsystem 50 is substantially as described above and shown in FIG. 6. Exiting array source subsystem 50 is imaging beam array 96. According to this embodiment, imaging beam array 96 comprises up to 64 individually controllable, spaced-apart laser beams, each modulated so as to form a desired pattern on photoreceptive surface 102.

A polygon mirror and lens assembly 104 includes a number of optical elements 106 which serve to provide a compact optical path and optical beam conditioning and correction for the beams produced by first and second integrated multi-beam sources 52, 54, and are beyond the scope of the present description.

Beams forming imaging beam array 96 share a common optical path through most of the scanning optical system, which promotes optomechanical and beam pointing stability. The elements comprising array source subsystem 50 are positioned and disposed such that optical elements 106 and rotating polygon mirror 108 scan the beams produced by first and second integrated multi-beam sources 52, 54 on photoreceptive surface 102 (such as a photoreceptor) at a spacing determined in part by the relative spacing of the beams at their respective sources. That is, the individual emitter positions in first and second integrated multi-beam sources 52, 54 relative to one another determine in part the spacing of spots for each pixel on the photoreceptive surface.

Figure 9:
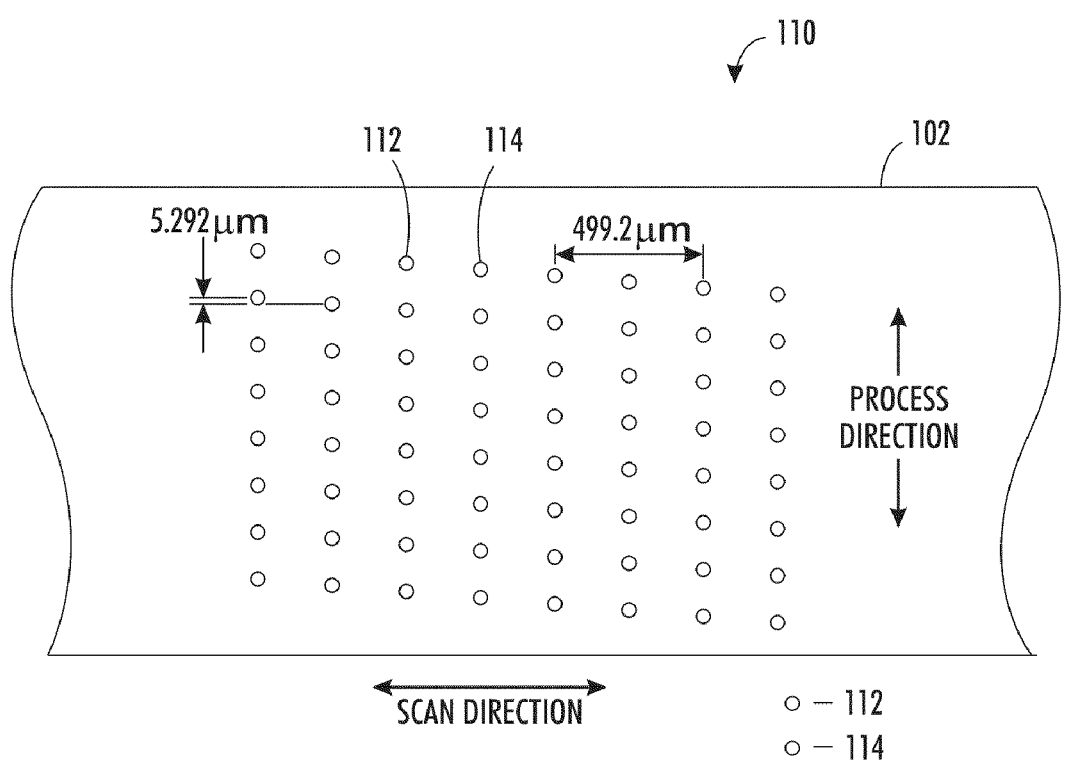
FIG. 9 an exemplary spot array pattern, representing spots at which beams from two independent integrated multi-beam sources may be incident on a photoreceptive surface, according to one embodiment of this disclosure.

Specifically, one exemplary array 110 of spots on a photoreceptive surface according to one embodiment of this disclosure is illustrated in FIG. 9 (which, as with all figures hereof, is not drawn to scale). Spots 112 at which beams from first integrated multi-beam source 52 incident on surface 102 are spaced apart from one another by an amount which is proportional to the spacing of the emitters comprising first integrated multi-beam source 52. Likewise, spots 114 at which beams from second integrated multi-beam source 54 are spaced apart from one another by an amount which is proportional to the spacing of the emitters comprising second integrated multi-beam source 54. The positions of the spots 112, 114 relative to one another are shifted by an amount determined by, among other things, the placement of the first and second integrated multi-beam sources 52, 54 relative to one another (it being assumed that the emitter spacing as between the first and second integrated multi-beam sources 52, 54 are generally the same) as well as the optics between the emitters and the photoreceptive surface 102. The arrays are slightly decentered relative to the optical axis of a collimator lens (not shown) and relative to each other in this manner to achieve the desired process direction beam spacing at the photosensitive surface.

Figure 1:
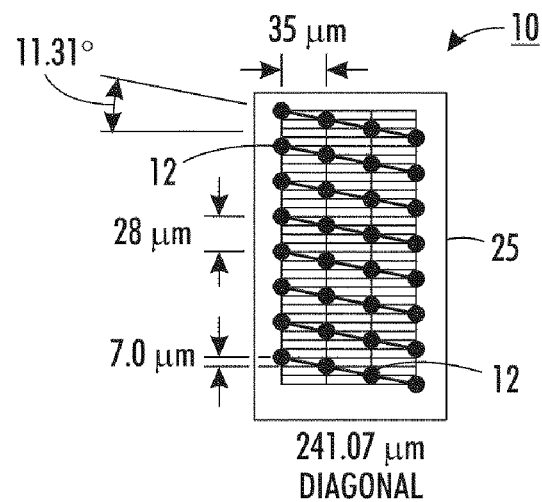
FIG. 1 is a plan view of a beam layout for a laser array simultaneously producing up to 32 individually addressable, spaced-apart light beams according to the prior art.
Figure 2:
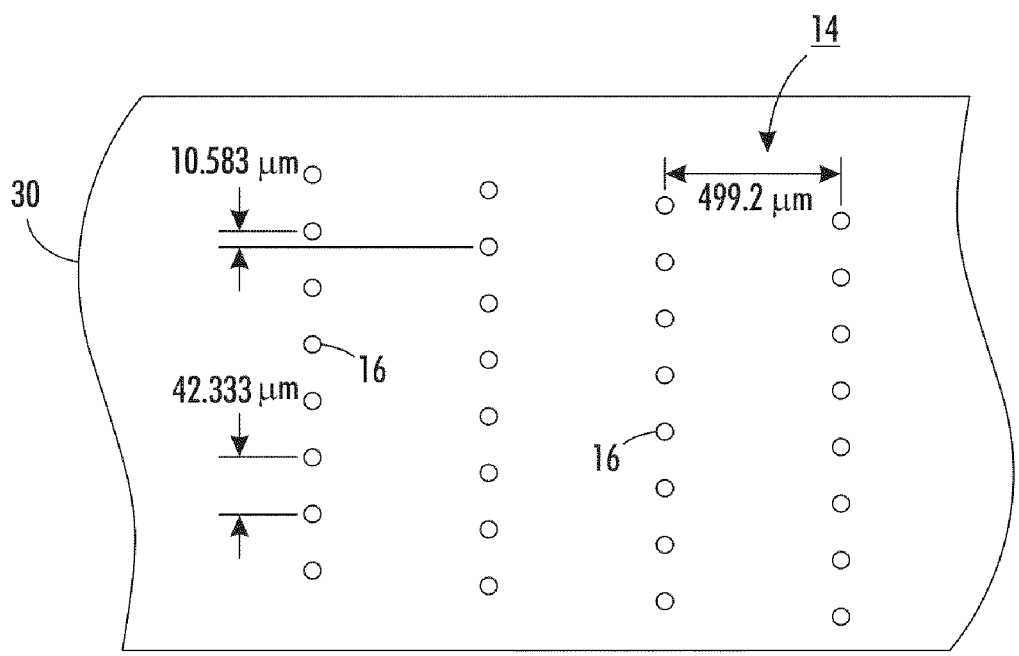
FIG. 2 is a 32-spot pattern produced at a photosensitive surface by a laser array producing 32 individually addressable, spaced-apart light beams according to the prior art.
Figure 3:
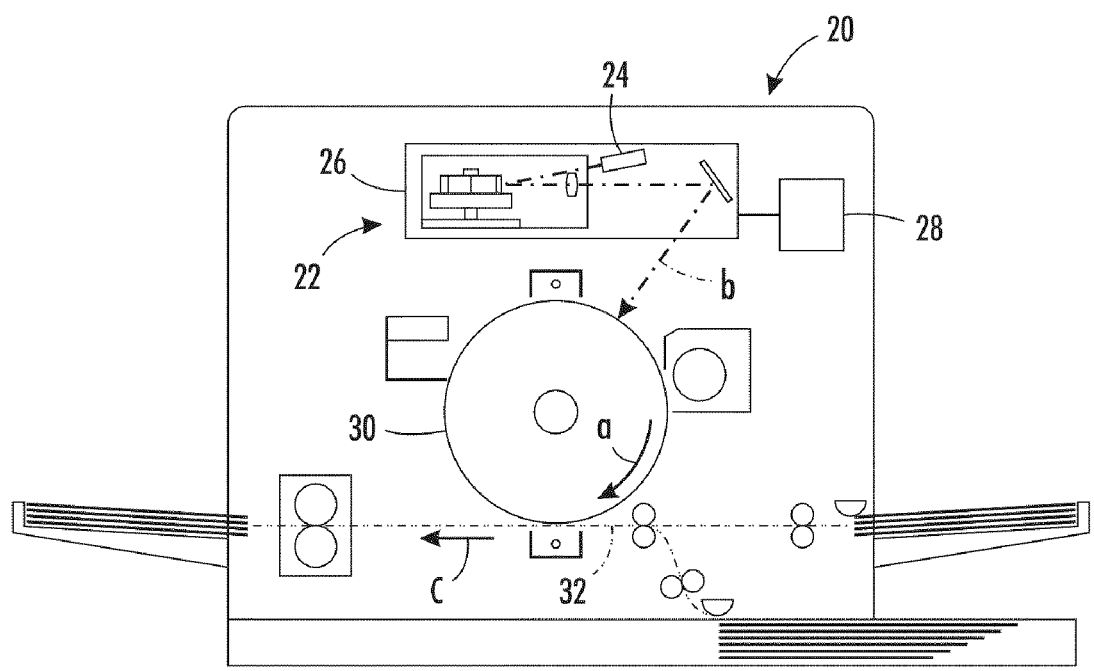
FIG. 3 is an illustration of an apparatus for forming an image on a photosensitive surface, such as in a printer, digital copier, or the like of a type known in the art.
Figure 4:
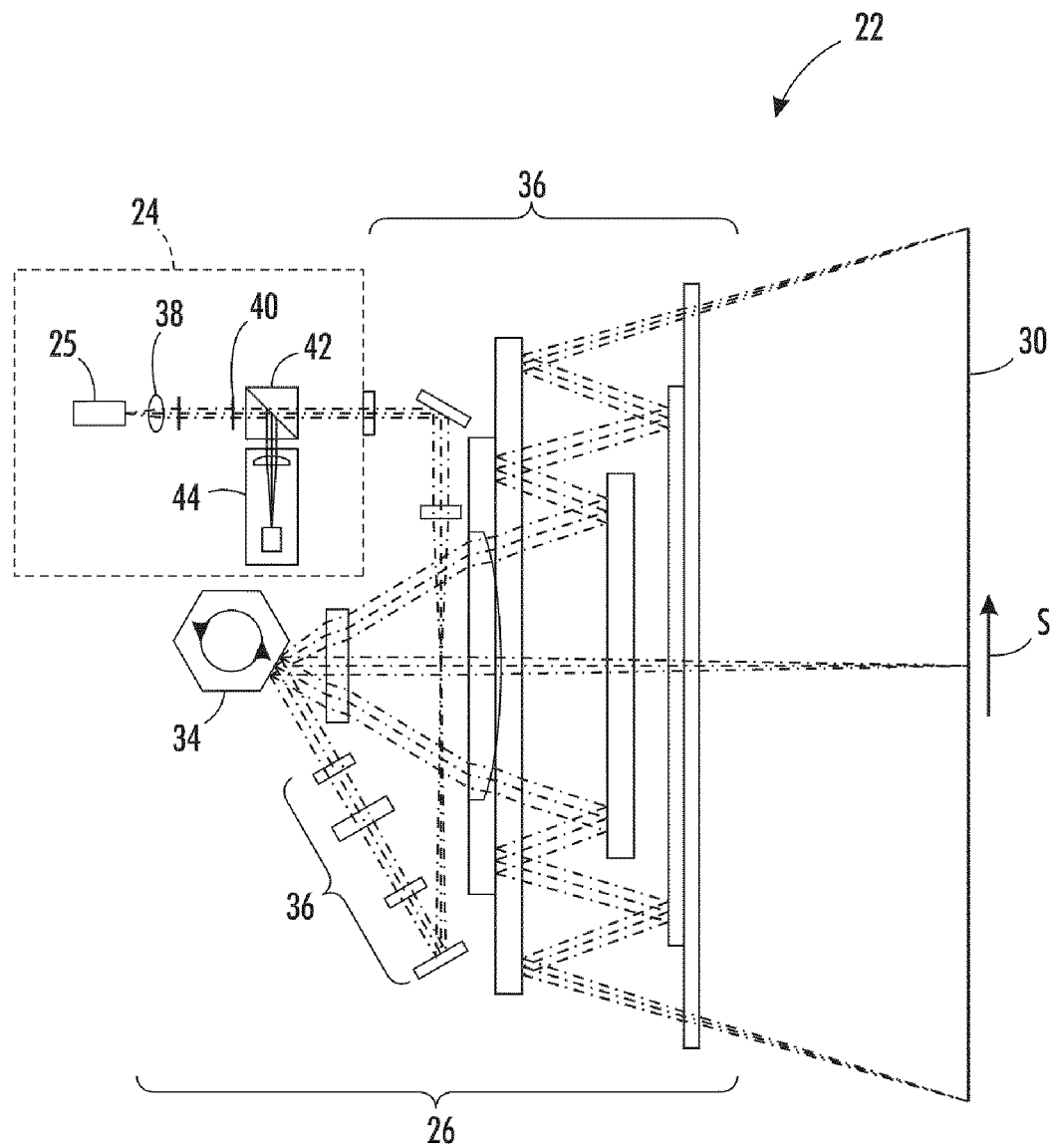
FIG. 4 is an illustration of the array source and raster output scanner and optics portion of an apparatus for forming an image on a photosensitive surface, such as a printer, digital copier, or the like of a type known in the art.
Figure 5:
FIG. 5 is an image of a type printed by a prior art printing apparatus illustrating the effect referred to as banding.

In one embodiment, the scan direction spacing is controlled so that the spots produced by first and second integrated multi-beam sources 52, 54 are in the range 200-300 microns apart in the scan direction, roughly 249 microns for the embodiment shown in FIG. 9. Furthermore, in one embodiment, the spots produced by first and second integrated multi-beam sources 52, 54 are in the range of 4-6 microns apart in the process direction, roughly 5.292 microns (4800 spi) for the embodiment shown in FIG. 9. An example of the individual emitter spacings for first and second integrated multi-beam sources 52, 54 is given with reference to FIG. 1. It will be appreciated that the orientations and spacings discussed herein are for exemplary embodiments, and spacings other than those specifically discussed herein are contemplated and within the scope of the present disclosure.

Figure 10:
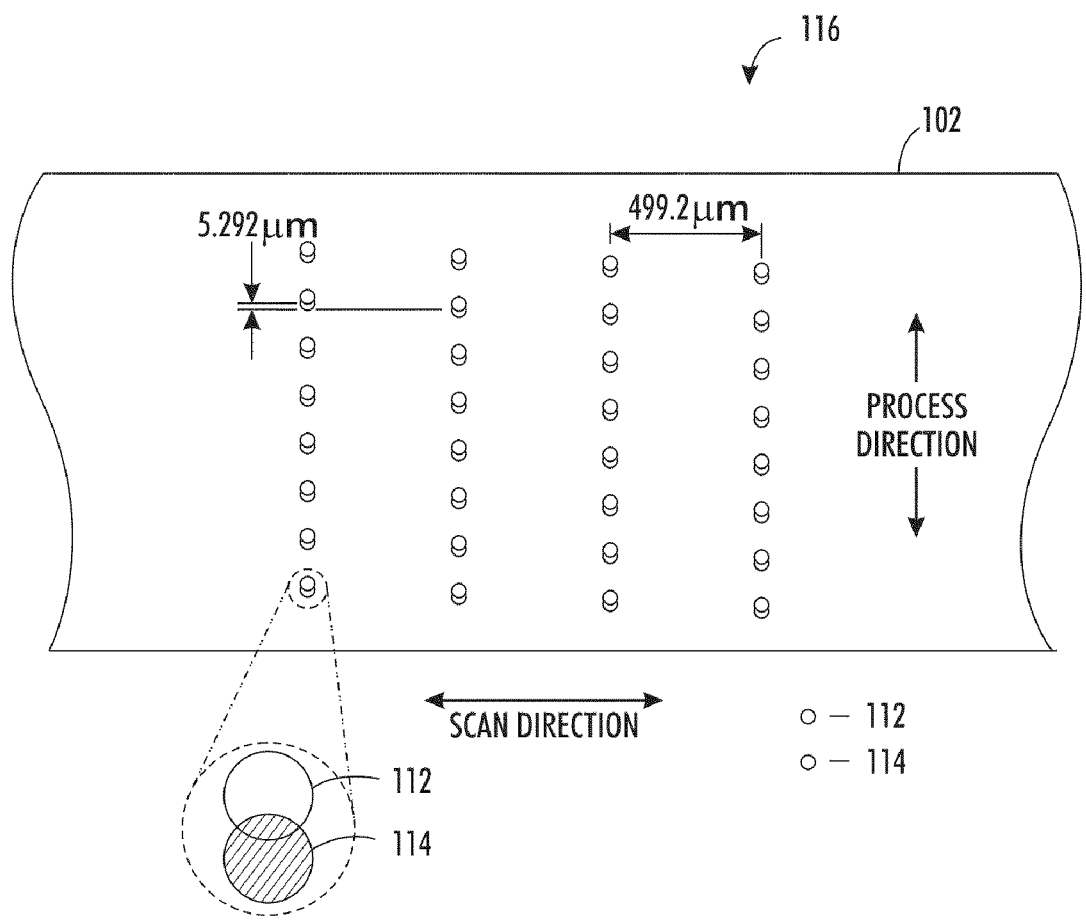
FIG. 10 is another exemplary spot array pattern, representing spots at which beams from two independent integrated multi-beam sources may be incident on a photoreceptive surface, according to another embodiment of this disclosure.

FIG. 10 illustrates an alternate arrangement 116 of spots 112, 114 on a photoreceptive surface 102 according to another embodiment of this disclosure. In this embodiment, columns of spots 112, 114 are not shifted relative to one another, but rather are co-columnar. Rows of spots are, however, shifted relative to one another. For example, the spots produced by first and second integrated multi-beam sources 52, 54 are in the range of 4-6 microns apart in the process direction, again roughly 5.292 microns (4880 spi) for the embodiment shown in FIG. 10. This pattern may be produced by controlling the relative positions of first and second integrated multi-beam sources 52, 54, and/or related optics, particularly when each source 52, 54 has the same emitter spacings (such as that shown and described with reference to FIG. 1). Many other spot spacings and patterns are possible and contemplated hereby. Thus, it will be appreciated that the specific spacing and pattern for spots 112, 114 is a matter of design choice, and not a limitation in the scope of the present disclosure.

Figure 11:
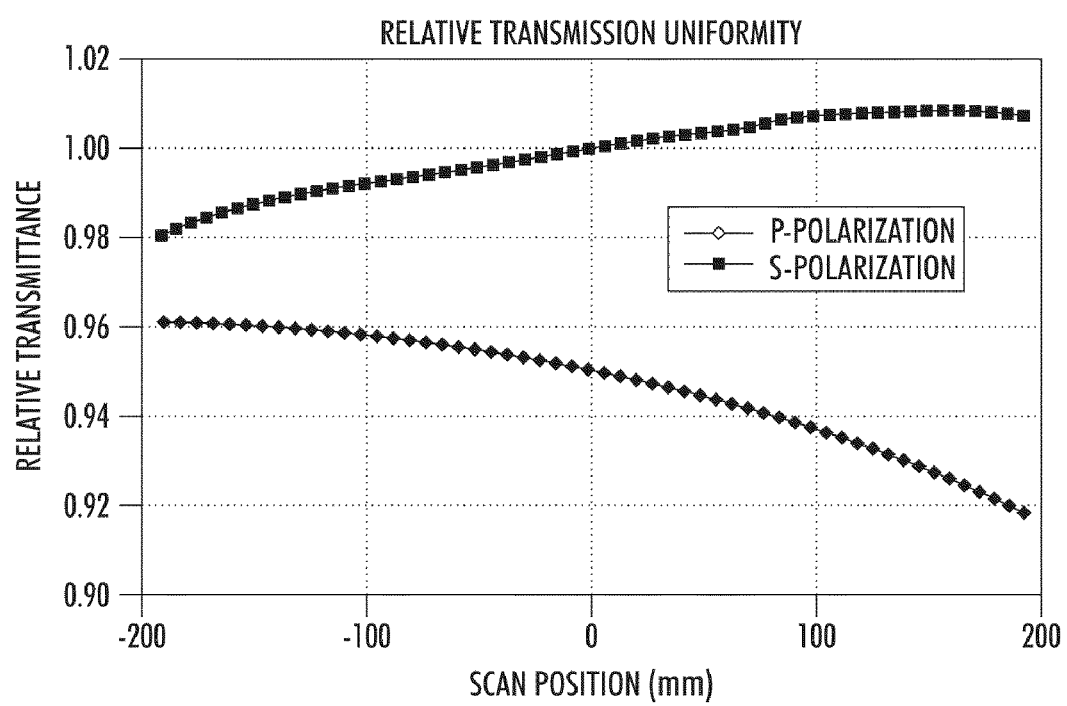
FIG. 11 is a graph of relative transmittance against scan position for p-polarized light and for s-polarized light at the photoreceptive surface according to one embodiment of this disclosure.

FIG. 11 is a graph of relative transmittance against scan position for p-polarized light and for s-polarized light at the photoreceptive surface 102. As can be seen, transmission is position dependent and non-linear for both p-polarized light and s-polarized light. However, electronic scan compensation can be applied, for example within driver systems 86, 88, or via controllable optical elements (not shown) to minimize the positional non-linear dependencies.

Figure 12:
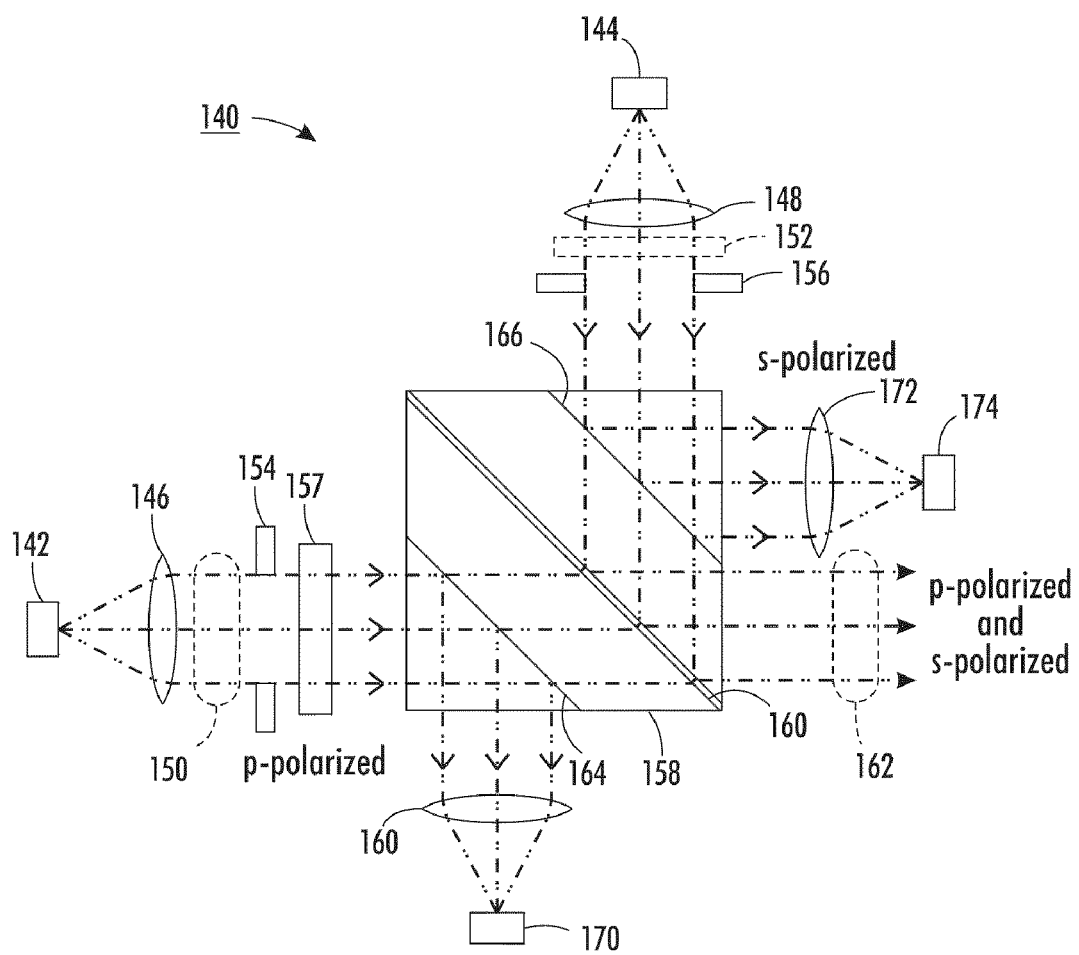
FIG. 12 is an illustration of an array source subsystem comprising an integrated polarizing and non-polarizing splitter and two multi-beam sources according to one embodiment of the present disclosure.

The preceding description has been of a system employing essentially three beam splitters—two non-polarized splitters for beam monitoring, and one polarized splitter for combining beam arrays 60, 62. However, it is possible using the concepts of this disclosure to obtain an array source subsystem with a reduced number of splitters. For example, with reference to FIG. 12, an array source subsystem 140 is shown comprising first and second integrated multi-beam sources 142, 144, respectively, each comprising a plurality of laser emitters (individual emitters not shown) for simultaneously producing a plurality of independently controllable laser beams. Again, the light output from sources 142, 144 may be polarized, for example s-polarized, or discrete optical elements (not shown) may be provided to initially polarize the outputs of the sources. Optical elements 146, 148 direct the beams produced by the individual emitters of first and second integrated multi-beam sources 142, 144, respectively, into beam arrays 150, 152. Apertures 154, 156 limit the beam width of the first and second beam arrays 150, 152, respectively. In addition, half-wave plate 157 is placed in the path of first beam array 150 to rotate the polarization of the beams of first beam array 150 from s-polarized light to p-polarized light as previously described.

Array source subsystem 140 further comprises an cube-type optical beam splitter 158 disposed in the optical path of first and second beam arrays 150, 152. Splitter 158 includes a polarizing splitter portion 160 which selectively transmits light of a first polarization, for example p-polarized light, and reflects light of a second polarization, for example s-polarization. Accordingly, splitter 158 may transmit the p-polarized beams of first beam array 150 into an image path. The s-polarized beams of second beam array 152 are made to be incident on polarizing splitter portion 160 such that they are reflected into the image path, generally parallel to image path of the beams of first beam array 150. The individual spatially separated beams exiting splitter 158 in the imaging path (toward the ROS subsystem) form an imaging beam array 162 comprised of a plurality of individual, spatially separated beams of both p-polarized and s-polarized light.

Splitter 158 further includes non-polarized, partially reflective surfaces 164, 166, each for example 5% reflective and 95% transmissive. A portion of light in first beam array 150 may then be reflected by surface 164 through focusing optics 168 to first beam monitor 170 for evaluating beam intensity, quality, position, etc., of the light comprising beam array 150 (and which may, for example, be used to modify the driving of source 142 to achieve a desired beam power). Similarly, a portion of light in second beam array 152 may be reflected by surface 166 through focusing optics 172 to second beam monitor 174 for evaluating beam intensity, quality, position, etc., of the light comprising second beam array 152 (and which may, for example, be used to modify the driving of source 144 to achieve a desired beam power).

Array source subsystem 140 may, for example, take the place of array source subsystem 50 in a beam array scanning system 100 of the type illustrated and described with reference to FIG. 8. Similar to array source subsystem 50, array source subsystem 140 effectively doubles the number of beams, and hence spots, available for writing to the photosensitive surface, providing an imaging beam array of as many as 64 individual, independently controllable beams if current state of the art 32-emitter arrays are employed (although integrated devices with a greater or lesser number of emitters may be used, with the final number of beams in the combined beam array being accordingly higher or lower). As optical power at the photoreceptor is essentially the sum of the power of the beams comprising imaging beam array 162, the loss of beam power at half-wave plate 157 and partially reflective surfaces 164, 166 is more than offset by the increase in the number of individual beams. So the laser power requirement per beam is significantly reduced. Furthermore, the optical power which does not form a part of the imaging beam array 162 is used for automatic power control (APC) detection and other aspects of monitoring and controlling the output of the integrated multi-beam sources 142, 144.

Figure 15:
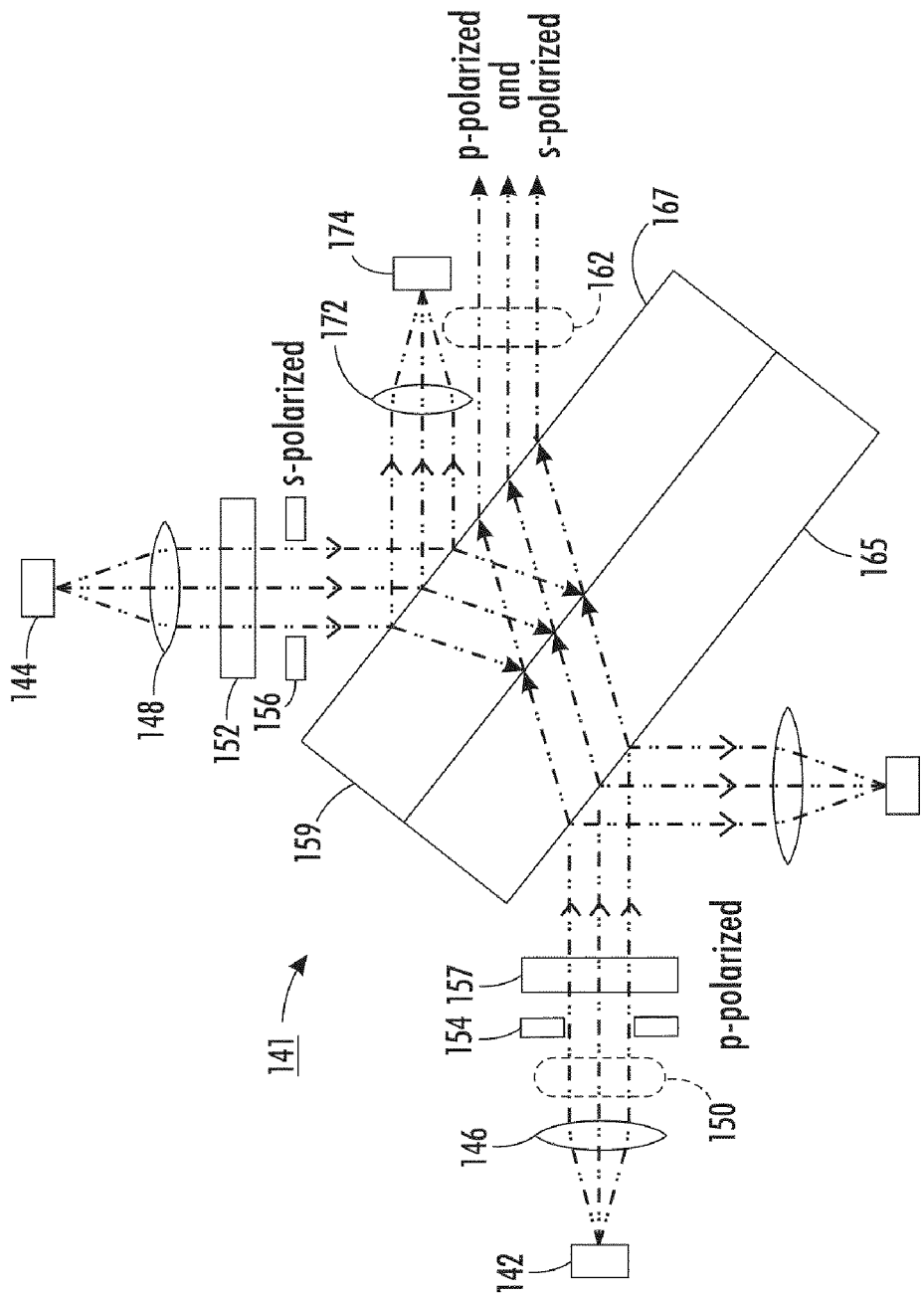
FIG. 15 is an illustration of an array source subsystem comprising an integrated polarizing and non-polarizing plate-type splitter and two multi-beam sources according to another embodiment of the present disclosure.

While the foregoing description has been in terms of a cube-type beam splitter 158, a similar embodiment may be implemented using a dual plate beam splitter, such as illustrated in FIG. 15, with cube beam splitter 158 of array source subsystem 140 replaced with dual plate beam splitter 159 for array source subsystem 141. Splitter 159 further includes non-polarized, partially reflective surfaces 165, 167, each for example 5% reflective and 95% transmissive. A portion of light in first beam array 150 may then be reflected by surface 165 through focusing optics 168 to first beam monitor 170 for evaluating beam intensity, quality, position, etc., of the light comprising beam array 150 (and which may, for example, be used to modify the driving of source 142 to achieve a desired beam power). Similarly, a portion of light in second beam array 152 may be reflected by surface 167 through focusing optics 172 to second beam monitor 174 for evaluating beam intensity, quality, position, etc., of the light comprising second beam array 152 (and which may, for example, be used to modify the driving of source 144 to achieve a desired beam power).

Figure 13:
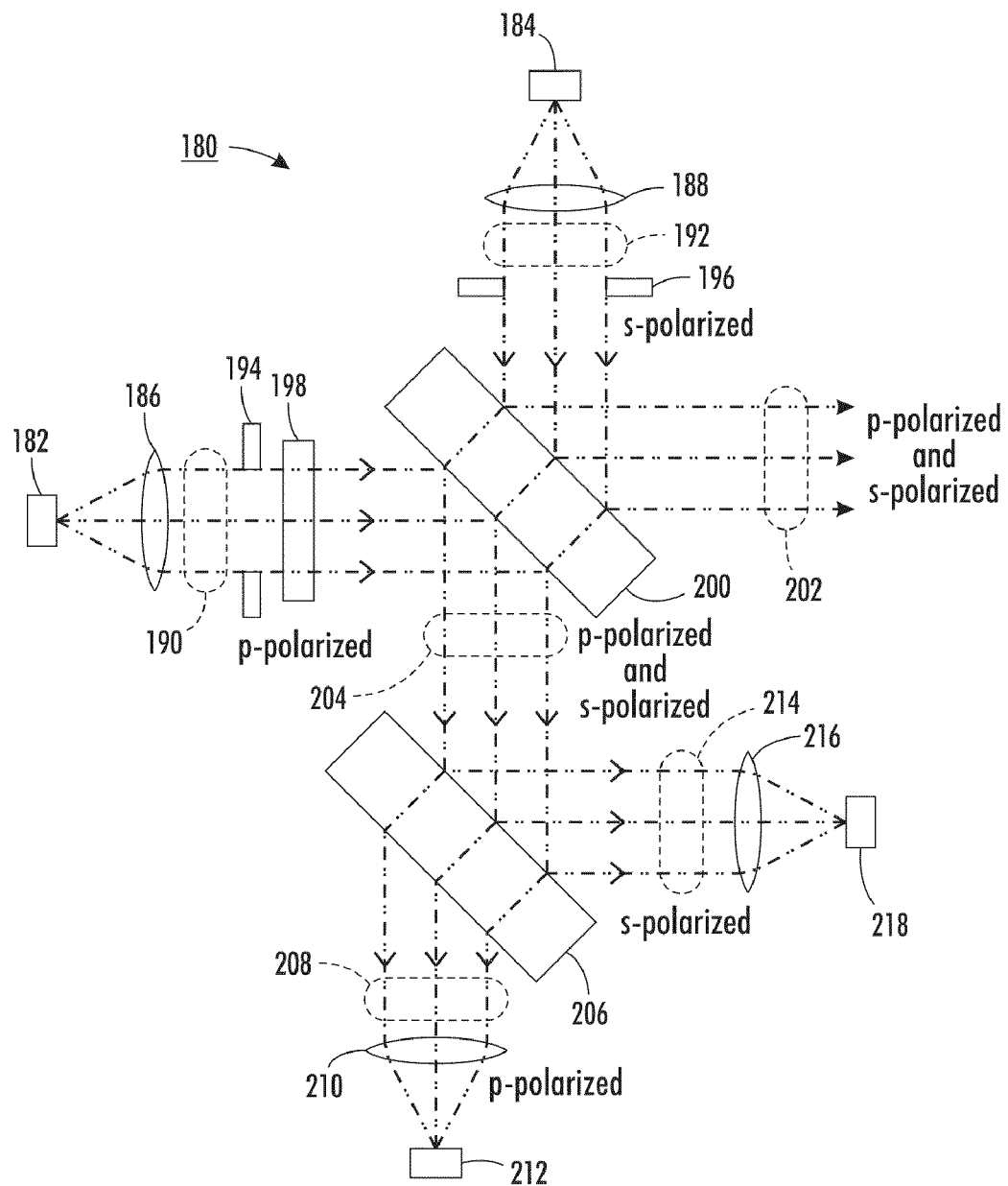
FIG. 13 is an illustration of an array source subsystem comprising two polarizing splitters and two multi-beam sources according to another embodiment of the present disclosure.

Another embodiment of an array source subsystem with a reduced number of beam splitters is illustrated in FIG. 13. Array source subsystem 180 is shown comprising first and second integrated multi-beam sources 182, 184, each comprising a plurality of laser emitters (individual emitters not shown) for simultaneously producing a plurality of independently controllable laser beams. Again, the light output from sources 182, 184 may be polarized, for example s-polarized, or discrete optical elements may be provided to polarize the outputs of the sources. Optical elements 186, 188 direct the beams produced by the individual emitters of first and second integrated multi-beam sources 182, 184, respectively, into beam arrays 190, 192. Apertures 194, 196 limit the beam width of the first and second beam arrays 190, 192, respectively. In addition, half-wave plate 198 is placed in the path of first beam array 190 to rotate the polarization of the beams of first beam array 190 from s-polarized light to p-polarized light as previously described.

Array source subsystem 180 further comprises a polarizing splitter 200 disposed in the optical path of first and second beam arrays 190, 192. Polarizing splitter 200 selectively transmits light of a first polarization, for example p-polarized light, and reflects light of a second polarization, for example s-polarization. In this embodiment, polarizing splitter 200 is "leaky" in that it transmits most of the p-polarized light, but reflects some of that light, and similarly reflects most of the s-polarized light but transmits some of that light. In one embodiment, splitter 200 transmits approximately 95% of the p-polarized light, and reflects approximately 5% of that p-polarized light, and furthermore reflects approximately 95% of the s-polarized light and transmits approximately 5% of the s-polarized light. The majority of the light energy of the individual spatially separated beams from beam arrays 190, 192 exits splitter 200 in the imaging path (toward the ROS subsystem), forming an imaging beam array 202 comprised of a plurality of individual, spatially separated beams of both p-polarized and s-polarized light. The balance of the light energy of the individual spatially separated beams from beam arrays 190, 192 exits splitter 200 roughly perpendicular to the imaging path, forming a monitoring beam array 204 also comprised of a plurality of individual, spatially separated beams of both p-polarized and s-polarized light.

Monitoring beam array 204 is directed toward polarizing splitter 206, which separates the p-polarized components and the s-polarized components of beam array 204. The p-polarized component is transmitted by splitter 206 as a p-polarized monitoring beam array 208 to focusing optics 210, which focuses beam array 208 onto first beam monitor 212 for evaluating beam intensity, quality, position, etc., of the light comprising beam array 208 (and which may, for example, be used to modify the driving of source 182 to achieve a desired beam power). The s-polarized portion of light in beam array 204 is reflected by splitter 206 as an s-polarized monitoring beam array 214 through focusing optics 216 to second beam monitor 218 for evaluating beam intensity, quality, position, etc., of the light comprising beam array 214 (and which may, for example, be used to modify the driving of source 184 to achieve a desired beam power). By splitting the p- and s-polarized components of beam array 204, individual control over sources 182 and 184 are provided with only two optical splitters, reducing optical loss in the array source subsystem.

Array source subsystem 180 may also take the place of array source subsystem 50 in a beam array scanning system 100 of the type illustrated and described with reference to FIG. 8. The number of beams, and hence spots, available for writing to the photosensitive surface are again effectively doubled, providing an imaging beam array of as many as 64 individual, independently controllable beams if current state of the art 32-emitter arrays are employed (although integrated devices with a greater or lesser number of emitters may be used, with the final number of beams in the combined beam array being accordingly higher or lower). The majority of the optical power not otherwise directed to the photosensitive surface is used for automatic power control (APC) detection and other aspects of monitoring and controlling the output of the integrated multi-beam sources 182, 184.

Figure 14:
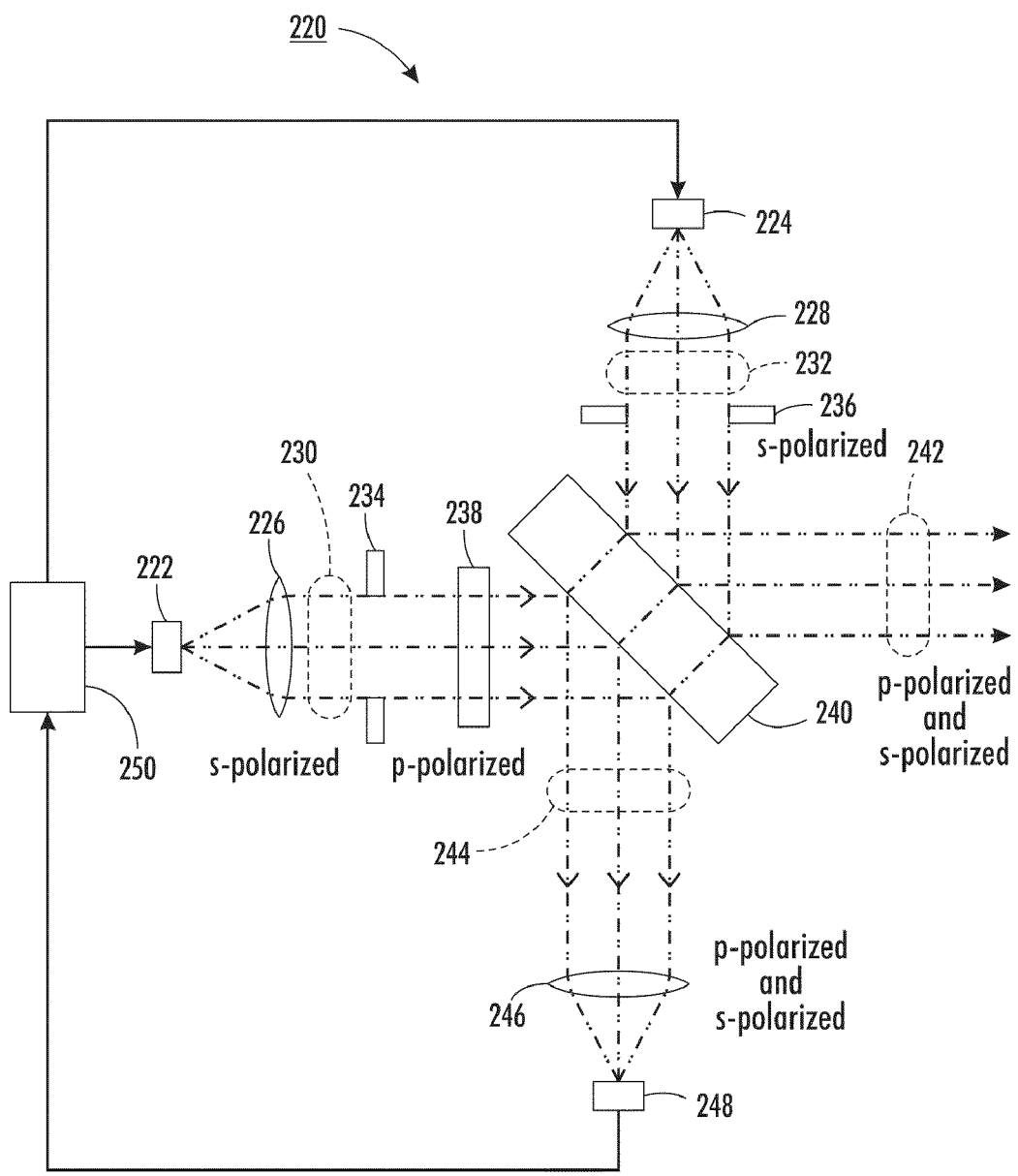
FIG. 14 is an illustration of an array source subsystem comprising a single polarizing splitter and two multi-beam sources according to yet another embodiment of the present disclosure.

An embodiment of an array source subsystem 220 requiring only a single splitter is illustrated in FIG. 14. Array source subsystem 220 comprises first and second integrated multi-beam sources 222, 224, each comprising a plurality of laser emitters (individual emitters not shown) for simultaneously producing a plurality of independently controllable laser beams. Light output from sources 222, 224 may be polarized, for example s-polarized, or discrete optical elements (not shown) may be provided to polarize the outputs of sources 222, 224. Optical elements 226, 228 direct the beams produced by the individual emitters of sources 222, 224, respectively, into beam arrays 230, 232. Apertures 234, 236 limit the beam width of the first and second beam arrays 230, 232, respectively. In addition, half-wave plate 238 is placed in the path of first beam array 230 to rotate the polarization of the beams of first beam array 230 from s-polarized light to p-polarized light as previously described.

Array source subsystem 220 further comprises a polarizing splitter 240 disposed in the optical path of first and second beam arrays 230, 232. Polarizing splitter 240 selectively transmits light of a first polarization, for example p-polarized light, and reflects light of a second polarization, for example s-polarization. In this embodiment, polarizing splitter 240 is again "leaky" in that it transmits most of the p-polarized light, but reflects some of that light, and similarly reflects most of the s-polarized light but transmits some of that light. In one embodiment, splitter 240 transmits approximately 95% of the p-polarized light, and reflects approximately 5% of that p-polarized light, and furthermore reflects approximately 95% of the s-polarized light and transmits approximately 5% of the s-polarized light. The majority of the light energy of the individual angularly separated beams from beam arrays 230, 232 exits splitter 240 in the imaging path (toward the ROS subsystem), forming an imaging beam array 242 comprised of a plurality of individual, spatially separated beams of both p-polarized and s-polarized light. The balance of the light energy of the individual angularly separated beams from beam arrays 230, 232 exits splitter 240 roughly perpendicular to the imaging path, forming a monitoring beam array 244 also comprised of a plurality of individual, angularly separated beams of both p-polarized and s-polarized light.

Monitoring beam array 244 is directed toward focusing optics 246, which focuses beam array 244 onto beam monitor 248 for evaluating beam intensity, quality, position, etc., of the light comprising beam array 244. In this embodiment, sources 222 and 224 are driven synchronously, and the timing of their driving is coordinated with the timing of the sensing of monitor beam array 244 such that the source of the beam sensed by beam monitor 248 may be resolved as between first integrated multi-beam source 222 and second integrated multi-beam source 224. Time divisional multiplexing is one method which may be employed to resolve the source for sensed light. The data from beam monitor 248 may be used by an appropriate driving apparatus 250 to individually drive sources 222, 224 to obtain the desired beam characteristics at the photosensitive surface. By splitting the p- and s-polarized components of beam array 204 in the time domain, individual control over sources 222 and 224 are provided with only a single optical splitter 240, further reducing optical loss in the array source subsystem.

Array source subsystem 220 may also take the place of array source subsystem 50 in a beam array scanning system 100 of the type illustrated and described with reference to FIG. 8. The number of beams, and hence spots, available for writing to the photosensitive surface are again effectively doubled, providing an imaging beam array of as many as 64 individual, independently controllable beams if current state of the art 32-emitter arrays are employed (although integrated devices with a greater or lesser number of emitters may be used, with the final number of beams in the combined beam array being accordingly higher or lower). The majority of the optical power not otherwise directed to the photosensitive surface is used for automatic power control (APC) detection and other aspects of monitoring and controlling the output of the integrated multi-beam sources 222, 224.

Figure 16:
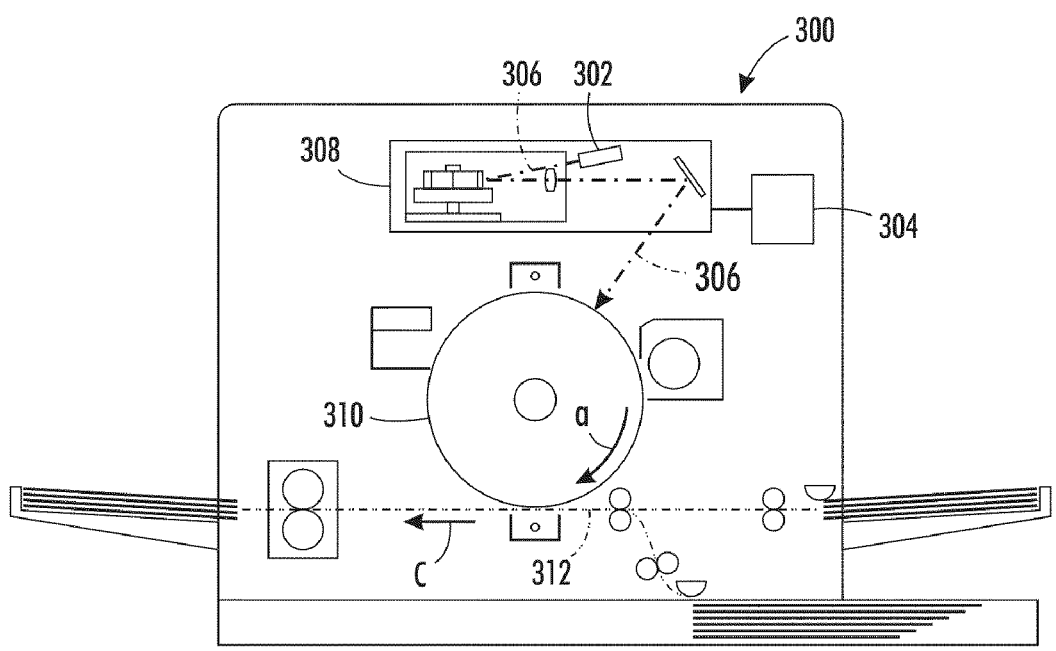
FIG. 16 is an apparatus for forming an image on a photosensitive surface, such as a printer, digital copier, or the like according to an embodiment of the present disclosure.

Finally, according to another aspect of the present disclosure illustrated in FIG. 16, an imaging system 300 is provided which comprises an array source subsystem 302 of at least two integrated multi-beam sources (not shown) and at least one splitter (not shown) which, under the control of controller 304, outputs an imaging beam array 306 to a beam array scanning subsystem 308. Beam array scanning subsystem 308 in turn directs imaging beam array 306 through various system optical elements (not shown) and ultimately to a photosensitive surface such as the surface of photoreceptor 310. Pulsed and scanned imaging beam array 306 may then form a latent image on photoreceptor 310 which may be transferred to an imaging substrate 312 such as paper.

It will now be appreciated that an electrophotographic marking system with increased scan resolution is disclosed herein which does not require an increase in the number of laser sources of the integrated array. A variety of embodiments have been disclosed in which polarization and beam splitting are used to combine beams from dual sources to obtain an imaging beam array while also providing beam monitoring. The components in such embodiments may be actively or passively aligned to each other with respect to 1, 2 (or 3) rotational degrees of freedom. Furthermore, a number of the surfaces in these embodiments are substantially parallel or perpendicular, simplifying manufacture of the array source subsystems. The beam combining assemblies do not substantially change the beam spacing in angular space nor substantially change the beam spacing in location space (e.g., the beam travels through refractive elements whose combined effect is equivalent to a parallel plate). Furthermore, the two input legs of the above-described embodiments are substantially symmetric to each other with respect to the symmetry plane formed by the polarization splitting layer.

The physics of modern electrical and mechanical devices and the methods of their production are not absolutes, but rather statistical efforts to produce a desired device and/or result. Even with the utmost of attention being paid to repeatability of processes, the quality of starting and processing materials, the accuracy of assembly, and so forth, variations and imperfections result. Accordingly, no limitation in the description of the present disclosure or its claims can or should be read as absolute. The limitations of the claims are intended to define the boundaries of the present disclosure, up to and including those limitations. To further highlight this, the term "substantially" may occasionally be used herein in association with a claim limitation (although consideration for variations and imperfections is not restricted to only those limitations used with that term). While as difficult to precisely define as the limitations of the present disclosure themselves, we intend that this term be interpreted as "to a large extent", "as nearly as practicable", "within technical limitations", and the like.

Furthermore, while a plurality of preferred exemplary embodiments have been presented in the foregoing detailed description, it should be understood that a vast number of variations exist, and these preferred exemplary embodiments are merely representative examples, and are not intended to limit the scope, applicability or configuration of the disclosure in any way. For example, the principles discussed herein apply to light sources other than lasers, such as light emitting diodes (LEDs), etc., and thus the descriptions herein of systems employing a laser source are exemplary and not exclusive descriptions of the systems according to the present disclosure. In addition, additional elements may be included in array source subsystems of the type disclosed herein, without departing from the broader scope of the disclosure. For example, the beam splitting elements may employ optically absorbing portions outside the nominal beam path to suppress spurious "ghost" light, light from a Fresnel reflex of a refractive interface is used to illuminate the monitoring photodiodes, etc. Furthermore, various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

What is claimed is:

1. An apparatus for forming an image on a photosensitive surface, comprising:
    a first integrated multi-beam source comprising a plurality of light emitters and optical elements disposed to simultaneously produce a plurality of first light beams having a first polarization and which are in substantially parallel optical paths, and which further are incident on said photosensitive surface at an array of first spots on said photosensitive surface, adjacent first spots spaced apart by a substantially uniform process-direction spacing and a substantially uniform scan-direction spacing;
    a second integrated multi-beam source comprising a plurality of light emitters and optical elements disposed to simultaneously produce a plurality of second plurality of light beams having a second polarization, different than said first polarization, and which further are in substantially parallel optical paths, said optical paths of said light beams produced by said second integrated multi-beam source being non-parallel to said optical paths of said light beams produced by said first integrated multi-beam source, said plurality of second plurality of light beams being incident on said photosensitive surface at an array of second spots on said photosensitive surface, adjacent second spots spaced apart by a substantially uniform process-direction spacing and a substantially uniform scan-direction spacing;
    a first polarizing optical beam splitter which is at least partially transmissive to light of said first polarization and at least partially reflective of light of said second polarization, disposed in the optical paths of both of said first and second plurality of light beams such that the optical paths of said first plurality of light beams and the optical paths of said second plurality of light beams are made to be substantially parallel to one another, said first polarizing optical beam splitter outputting an imaging beam array into an imaging path, said imaging beam array containing a portion of optical energy of said first and said second plurality of light beams;
    wherein said first integrated multi-beam source and said second integrated multi-beam source are positioned and disposed such that said second light spots are shifted in position relative to said first light spots at said photosensitive surface, and further where a portion of the optical energy of said first light beams is directed to a first beam monitor and a portion of the optical energy of said second plurality of light beams is directed to a second beam monitor.

2. The apparatus of claim 1, wherein said second light spots are shifted in position relative to said first light spots by substantially one-half of said process-direction spacing.

3. The apparatus of claim 2, wherein said second light spots are further shifted in position relative to said first light spots by substantially one-half of said scan-direction spacing.

4. The apparatus of claim 3, wherein said first and second plurality of light beams are each emitted by said first integrated multi-beam source and said second integrated multi-beam source, respectively, as s-polarized light beams, and further comprising a half-wave plate located in the optical path of said first plurality of light beams and between said first integrated multi-beam source and said first polarizing optical beam splitter which shifts the polarization of said first plurality of light beams from s-polarized to p-polarized.

5. The apparatus of claim 1, further comprising a first driver for driving said first integrated multi-beam source, said first beam monitor communicatively coupled to said first driver such that the output from said first beam monitor may be used to control the driving of said first integrated multi-beam source, and a second driver for driving said second integrated multi-beam source, said second beam monitor communicatively coupled to said second driver such that the output from said second beam monitor may be used to control the driving of said second integrated multi-beam source.

6. The apparatus of claim 4, further comprising:
    a first non-polarizing beam splitter located in the optical path of said first plurality of light beams and between said first integrated multi-beam source and said first polarizing optical beam splitter; and
    a first beam monitor having a first beam receiving surface positioned and disposed such that;
        a portion of each of said first plurality of light beams is reflected by said first non-polarizing beam splitter into a path toward said first beam receiving surface;
        the remainder of each of said first plurality of light beams is transmitted by said first non-polarizing beam splitter into a path toward said first polarizing beam splitter;
    a second non-polarizing beam splitter located in the optical path of said second plurality of light beams and between said second integrated multi-beam source and said first polarizing optical beam splitter; and a second beam monitor having a second beam receiving surface positioned and disposed such that;
   a portion of each of said second plurality of light beams is reflected by said second non-polarizing beam splitter into a path toward said second beam receiving surface; and
   the remainder of each of said second plurality of light beams is transmitted by said second non-polarizing beam splitter into a path toward said first polarizing beam splitter.

7. The apparatus of claim 6, further comprising a first driver for driving said first integrated multi-beam source, said first beam monitor communicatively coupled to said first driver such that the output from said first beam monitor may be used to control the driving of said first integrated multi-beam source, and a second driver for driving said second integrated multi-beam source, said second beam monitor communicatively coupled to said second driver such that the output from said second beam monitor may be used to control the driving of said second integrated multi-beam source.

8. The apparatus of claim 4, wherein:
said first polarizing optical beam splitter comprising:
   first and second non-polarizing beam splitting layers; and
   a first polarizing optical beam splitting layer disposed between said first and second non-polarizing beam splitting layers;
further comprising:
a first beam monitor having a first beam receiving surface positioned and disposed such that;
   a portion of each of said first plurality of light beams is reflected by said first non-polarizing beam splitting layer into a path toward said first beam receiving surface;
   the remainder of each of said first plurality of light beams is transmitted by said first non-polarizing beam splitting layer into a path toward said first polarizing beam splitting layer;
a second beam monitor having a second beam receiving surface positioned and disposed such that;
   a portion of each of said second plurality of light beams is reflected by said second non-polarizing beam splitting layer into a path toward said second beam receiving surface; and
   the remainder of each of said second plurality of light beams is transmitted by said second non-polarizing beam splitting layer into a path toward said first polarizing beam splitting layer.

9. The apparatus of claim 8, further comprising a first driver for driving said first integrated multi-beam source, said first beam monitor communicatively coupled to said first driver such that the output from said first beam monitor may be used to control the driving of said first integrated multi-beam source, and a second driver for driving said second integrated multi-beam source, said second beam monitor communicatively coupled to said second driver such that the output from said second beam monitor may be used to control the driving of said second integrated multi-beam source.

10. The apparatus of claim 4, wherein said first polarizing optical beam splitter is partially transmissive of light of first polarization and partly reflective of light of first polarization such that the majority of said first plurality of light beams are transmitted by said first polarizing optical beam splitter into said imaging path and the balance of said first plurality of light beams are reflected by said first polarizing optical beam splitter into a combined beam monitoring path, and further partially reflective of light of second polarization and partly transmissive of light of second polarization such that the majority of said second plurality of light beams are reflected by said first polarizing optical beam splitter into said imaging path and the balance of said second plurality of light beams are transmitted by said first polarizing optical beam splitter into said combined beam monitoring path, further comprising:
   a second polarizing optical beam splitter disposed in said combined beam monitoring path, said second polarizing optical beam splitter at least partially transmissive to light of said first polarization and at least partially reflective of light of said second polarization such that light in said combined beam monitoring path of said first polarization is substantially transmitted by said second polarizing optical beam splitter into a first beam monitoring path and light in said combined beam monitoring path of said second polarization is substantially reflected by said second polarizing optical beam splitter into a second beam monitoring path;
   a first beam monitor disposed in said first beam monitoring path having a first beam receiving surface for receiving beams in said first beam monitoring path, said first beam monitor determining optical attributes of said beams in said first beam monitoring path; and
   a second beam monitor disposed in said second beam monitoring path having a second beam receiving surface for receiving beams in said second beam monitoring path, said second beam monitor determining optical attributes of said beams in said second beam monitoring path.

11. The apparatus of claim 10, wherein said first polarizing optical beam splitter transmits at least 95% of the first plurality of light beams of the first polarization and reflects at least 95% of the second plurality of light beams of the second polarization.

12. The apparatus of claim 10, further comprising a first driver for driving said first integrated multi-beam source, said first beam monitor communicatively coupled to said first driver such that the output from said first beam monitor may be used to control the driving of said first integrated multi-beam source, and a second driver for driving said second integrated multi-beam source, said second beam monitor communicatively coupled to said second driver such that the output from said second beam monitor may be used to control the driving of said second integrated multi-beam source.

13. The apparatus of claim 4, wherein said first polarizing optical beam splitter is partially transmissive of light of first polarization and partly reflective of light of first polarization such that the majority of said first plurality of light beams are transmitted by said first polarizing optical beam splitter into said imaging path and the balance of said first plurality of light beams are reflected by said first polarizing optical beam splitter into a combined beam monitoring path, and further partially reflective of light of second polarization and partly transmissive of light of second polarization such that the majority of said second plurality of light beams are reflected by said first polarizing optical beam splitter into said imaging path and the balance of said second plurality of light beams are transmitted by said first polarizing optical beam splitter into said combined beam monitoring path, further comprising:
   a driver for driving said first and second integrated multi-beam sources timing with one another such that only of said first and second integrated multi-beam sources emits beams at any one time; and
   a beam monitor disposed in said combined beam monitoring path having a beam receiving surface for receiving beams in said combined beam monitoring path, said beam monitor determining optical attributes of said beams in said combined beam monitoring path in synchronization with said timed driving of said first and second integrated multi-beam sources such that said determining may resolve the combined optical beam monitoring path into beams from said first integrated multi-beam source and beams from said second integrated multi-beam source.

14. The apparatus of claim 13, wherein said beam monitor provides data which is time division multiplexed in order to resolve light emitted by said first integrated multi-beam source and said second integrated multi-beam source.

15. An imaging system, comprising:
an array source subsystem;
a controller subsystem for controlling the on/off state of beams from said array source subsystem in response to a desired image pattern to thereby cause said array source subsystem to produce an imaging beam array;
a beam array scanning subsystem receiving said imaging beam array and scanning said imaging beam array in a scan direction;
a photosensitive surface for receiving said scanning imaging beam array and marking material so as to produced a latent image thereon;
a substrate handling subsystem for positioning a substrate proximate said photosensitive surface for receiving said marking material and to thereby produce an image on said substrate;
said array source subsystem comprising:
 a first integrated multi-beam source comprising a plurality of light emitters and optical elements disposed to simultaneously produce a plurality of first light beams having a first polarization and which are in substantially parallel optical paths, and which further are incident on said photosensitive surface at an array of first spots on said photosensitive surface, adjacent first spots spaced apart by a substantially uniform process-direction spacing and a substantially uniform scan-direction spacing;
 a second integrated multi-beam source comprising a plurality of light emitters and optical elements disposed to simultaneously produce a plurality of second plurality of light beams having a second polarization, different than said first polarization, and which further are in substantially parallel optical paths, said optical paths of said light beams produced by said second integrated multi-beam source being non-parallel to said optical paths of said light beams produced by said first integrated multi-beam source, said plurality of second plurality of light beams being incident on said photosensitive surface at an array of second spots on said photosensitive surface, adjacent second spots spaced apart by a substantially uniform process-direction spacing and a substantially uniform scan-direction spacing;
 a first polarizing optical beam splitter which is at least partially transmissive to light of said first polarization and at least partially reflective of light of said second polarization, disposed in the optical paths of both of said first and second plurality of light beams such that the optical paths of said first plurality of light beams and the optical paths of said second plurality of light beams are made to be substantially parallel to one another, said first polarizing optical beam splitter outputting an imaging beam array into an imaging path, said imaging beam array containing a portion of the optical energy of said first and said second plurality of light beams;
 wherein said first integrated multi-beam source and said second integrated multi-beam source are positioned and disposed such that said second light spots are shifted in position relative to said first light spots at said photosensitive surface, and further where a portion of the optical energy of said first light beams is directed to a first beam monitor and a portion of the optical energy of said second plurality of light beams is directed to a second beam monitor.

16. The apparatus of claim 15, wherein said second laser spots are shifted in position relative to said first laser spots by substantially one-half of said process-direction spacing.

17. The apparatus of claim 15, further comprising:
a first non-polarizing beam splitter located in the optical path of said first plurality of light beams and between said first integrated multi-beam source and said first polarizing optical beam splitter; and
a first beam monitor having a first beam receiving surface positioned and disposed such that;
 a portion of each of said first plurality of light beams is reflected by said first non-polarizing beam splitter into a path toward said first beam receiving surface;
 the remainder of each of said first plurality of light beams is transmitted by said first non-polarizing beam splitter into a path toward said first polarizing beam splitter;
a second non-polarizing beam splitter located in the optical path of said second plurality of light beams and between said second integrated multi-beam source and said first polarizing optical beam splitter; and
a second beam monitor having a second beam receiving surface positioned and disposed such that;
 a portion of each of said second plurality of light beams is reflected by said second non-polarizing beam splitter into a path toward said second beam receiving surface; and
 the remainder of each of said second plurality of light beams is transmitted by said second non-polarizing beam splitter into a path toward said first polarizing beam splitter.

18. The apparatus of claim 15, wherein:
said first polarizing optical beam splitter comprising:
 first and second non-polarizing beam splitting layers; and
 a first polarizing optical beam splitting layer disposed between said first and second non-polarizing beam splitting layers;
and further comprising:
a first beam monitor having a first beam receiving surface positioned and disposed such that;
 a portion of each of said first plurality of light beams is reflected by said first non-polarizing beam splitting layer into a path toward said first beam receiving surface;
 the remainder of each of said first plurality of light beams is transmitted by said first non-polarizing beam splitting layer into a path toward said first polarizing beam splitting layer;
a second beam monitor having a second beam receiving surface positioned and disposed such that;
 a portion of each of said second plurality of light beams is reflected by said second non-polarizing beam splitting layer into a path toward said second beam receiving surface; and the remainder of each of said second plurality of light beams is transmitted by said second non-polarizing beam splitting layer into a path toward said first polarizing beam splitting layer.

19. The apparatus of claim 15, wherein said first polarizing optical beam splitter is partially transmissive of light of first polarization and partly reflective of light of first polarization such that the majority of said first plurality of light beams are transmitted by said first polarizing optical beam splitter into said imaging path and the balance of said first plurality of light beams are reflected by said first polarizing optical beam splitter into a combined beam monitoring path, and further partially reflective of light of second polarization and partly transmissive of light of second polarization such that the majority of said second plurality of light beams are reflected by said first polarizing optical beam splitter into said imaging path and the balance of said second plurality of light beams are transmitted by said first polarizing optical beam splitter into said combined beam monitoring path, further comprising:
- a second polarizing optical beam splitter disposed in said combined beam monitoring path, said second polarizing optical beam splitter at least partially transmissive to light of said first polarization and at least partially reflective of light of said second polarization such that light in said combined beam monitoring path of said first polarization is substantially transmitted by said second polarizing optical beam splitter into a first beam monitoring path and light in said combined beam monitoring path of said second polarization is substantially reflected by said second polarizing optical beam splitter into a second beam monitoring path;
- a first beam monitor disposed in said first beam monitoring path having a first beam receiving surface for receiving beams in said first beam monitoring path, said first beam monitor determining optical attributes of said beams in said first beam monitoring path; and
- a second beam monitor disposed in said second beam monitoring path having a second beam receiving surface for receiving beams in said second beam monitoring path, said second beam monitor determining optical attributes of said beams in said second beam monitoring path.

20. The apparatus of claim 15, wherein said first polarizing optical beam splitter is partially transmissive of light of first polarization and partly reflective of light of first polarization such that the majority of said first plurality of light beams are transmitted by said first polarizing optical beam splitter into said imaging path and the balance of said first plurality of light beams are reflected by said first polarizing optical beam splitter into a combined beam monitoring path, and further partially reflective of light of second polarization and partly transmissive of light of second polarization such that the majority of said second plurality of light beams are reflected by said first polarizing optical beam splitter into said imaging path and the balance of said second plurality of light beams are transmitted by said first polarizing optical beam splitter into said combined beam monitoring path, further comprising:
- a driver for driving said first and second integrated multi-beam sources timing with one another such that only of said first and second integrated multi-beam sources emits beams at any one time; and
- a beam monitor disposed in said combined beam monitoring path having a beam receiving surface for receiving beams in said combined beam monitoring path, said beam monitor determining optical attributes of said beams in said combined beam monitoring path in synchronization with said timed driving of said first and second integrated multi-beam sources such that said determining may resolve the combined optical beam monitoring path into beams from said first integrated multi-beam source and beams from said second integrated multi-beam source.

* * * * *